(12) United States Patent
Joy

(10) Patent No.: US 10,390,220 B2
(45) Date of Patent: Aug. 20, 2019

(54) PRIVACY-PRESERVING STREAM ANALYTICS

(71) Applicant: THE REGENTS OF THE UNIVERSITY OF CALIFORNIA, Oakland, CA (US)

(72) Inventor: Joshua Joy, Los Angeles, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 244 days.

(21) Appl. No.: 15/612,502

(22) Filed: Jun. 2, 2017

(65) Prior Publication Data

US 2017/0353855 A1  Dec. 7, 2017

Related U.S. Application Data

(60) Provisional application No. 62/344,974, filed on Jun. 2, 2016.

(51) Int. Cl.
| | |
|---|---|
| *H04W 12/02* | (2009.01) |
| *G06F 21/62* | (2013.01) |
| *H04L 29/06* | (2006.01) |
| *G06F 21/60* | (2013.01) |
| *H04L 9/06* | (2006.01) |
| *H04L 9/14* | (2006.01) |

(52) U.S. Cl.
CPC .......... *H04W 12/02* (2013.01); *G06F 21/602* (2013.01); *G06F 21/6227* (2013.01); *G06F 21/6254* (2013.01); *G06F 21/6263* (2013.01); *H04L 9/065* (2013.01); *H04L 9/14* (2013.01); *H04L 63/0421* (2013.01); *H04L 63/0428* (2013.01)

(58) Field of Classification Search
CPC .. H04W 12/02; G06F 21/602; G06F 21/6227; G06F 21/6254; G06F 21/6263; H04L 9/065; H04L 9/14; H04L 63/0421; H04L 63/0428
See application file for complete search history.

(56) References Cited

U.S. PATENT DOCUMENTS

| | | | | |
|---|---|---|---|---|
| 6,023,510 A | * | 2/2000 | Epstein | G06Q 20/383 380/285 |
| 8,112,422 B2 | * | 2/2012 | Srivastava | G06F 16/2462 707/737 |
| 8,626,749 B1 | * | 1/2014 | Trepetin | H04L 9/002 707/722 |
| 9,442,980 B1 | * | 9/2016 | Trepetin | G06F 21/6254 |

* cited by examiner

*Primary Examiner* — Brian F Shaw
(74) *Attorney, Agent, or Firm* — O'Banion & Ritchey LLP; John P. O'Banion

(57) ABSTRACT

Privacy-preserving stream analytics (personal data collection method, apparatus, and/or system) from an electronic (e.g., mobile) device providing communications, such as to a network (e.g., Internet). Data queries from a data analyst are received but not directly answered with a truthful query response. Truthful responses are privatized and anonymized based on a randomized response mechanism which releases privatized data and not the original answer. Anonymously transmitting randomized responses from the data owner to data aggregator using shares, each share of which is individually transmitted to an independent aggregator, which is configured for independently and asynchronously process each share, and sharing results with one another to arrive at a query response over an aggregate number of data owners.

24 Claims, 8 Drawing Sheets

Protection Against Corrupt Uploads - Centralized Mechanism

PRIVACY-PRESERVING STREAM ANALYTICS

CROSS-REFERENCE TO RELATED APPLICATIONS

This application claims priority to, and the benefit of, U.S. provisional patent application Ser. No. 62/344,974 filed on Jun. 2, 2016, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to data privacy, and more particularly to making data private over communication channels including the internet.

2. Background Discussion

Privacy is a continuing and ever-increasing challenge, in particular with regard to the number of users directing personal data to and from "the cloud", which comprises groups of servers which perform application functionality for users interacting with them on the internet. Local privacy techniques (e.g., randomized response) privatize data before releasing it to the cloud. However, these techniques perform poorly and do not scale. As more data owners participate, the estimation error due to the variance increases too rapidly and distorts the privatized data with respect to the ground truth. It will be recognized that the term "ground truth" is a term used in a number of fields referring to information obtained by direct observation (empirical evidence), instead of by inference. Existing cryptographic private write techniques do not scale gracefully to hundreds of millions of data owners and require on the order of tens of thousands of servers and require on the order of days to compute and process data owner writes. Similarly, existing cryptographic protection against corrupt messages does not scale to hundreds of millions of data owners and also requires on the order of days to process.

Accordingly, a need exists for non-distorting, scalable, privacy protection mechanisms for cloud interactions. The present disclosure fulfills that need and provides additional benefits.

BRIEF SUMMARY

The capability to perform real-time streaming privacy-preserving personal data collection that scales to hundreds of millions of users while maintaining utility, including accuracy in respect to ground truth, and protecting data owners privacy. The present disclosure is configured to provide any desired combination of the following benefits.

A protection for data owners when writing their responses to the cloud via a cryptographic private write that ensures all data owners messages being written to the cloud are anonymous as long as there is at least one honest aggregator which does not collude.

An efficient and scalable protection against data owners which may create malicious and corrupt pieces of data and uploads attempting to distort or affect the aggregate sum.

A protection against data breaches as the data owners performing a cryptographic private write, and only storing privatized data on the aggregation servers. Even if an attacker breaches the servers, the attacker does not learn information as the data is privatized (both private write and data is a privatized form).

A capability for each data owner to estimate their "game theoretic" cost of participating in privately disclosing their personal data weighing the benefits of deprivatization (probability of privacy being broken and data owner identified) versus utility (e.g., using the aggregate information in some useful way such as saving time).

A distributed privacy mechanism capability which improves the utility (i.e., correlation of privatized data to ground truth) as well as strengthens the privacy as the number of participants increases.

A centralized privacy mechanism which improves the utility (i.e., correlation of privatized data to ground truth) as well as strengthens the privacy as the number of participants increases.

A privacy mechanism which maintains constant utility (e.g., accuracy in respect to ground truth) even as the population increases and scales. Privacy also strengthens as the number of participating data owners increases.

A CrowdZen privacy whereby the randomness of the number of devices carried by data owners (e.g., both those that wish to conceal their privacy such as students and those that have weaker privacy concerns such as employees), the randomness of choosing to round a value, and the uncertainty and estimation error of the total population provide privacy protection.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

1. System Architecture

In at least one embodiment, the system is configured for analysts to run a population study. The analysts issue a query for those interested data owners that privately and anonymously reply. Analysts are able to formulate long-standing signed queries. These queries continually elicit privatized responses during the defined query epoch. The analysts are deemed to be reputable, such as authorized by the Department of Transportation, National Institutes of Health, or Centers for Disease Control. Each analyst controls an aggregation server.

Figure 1:
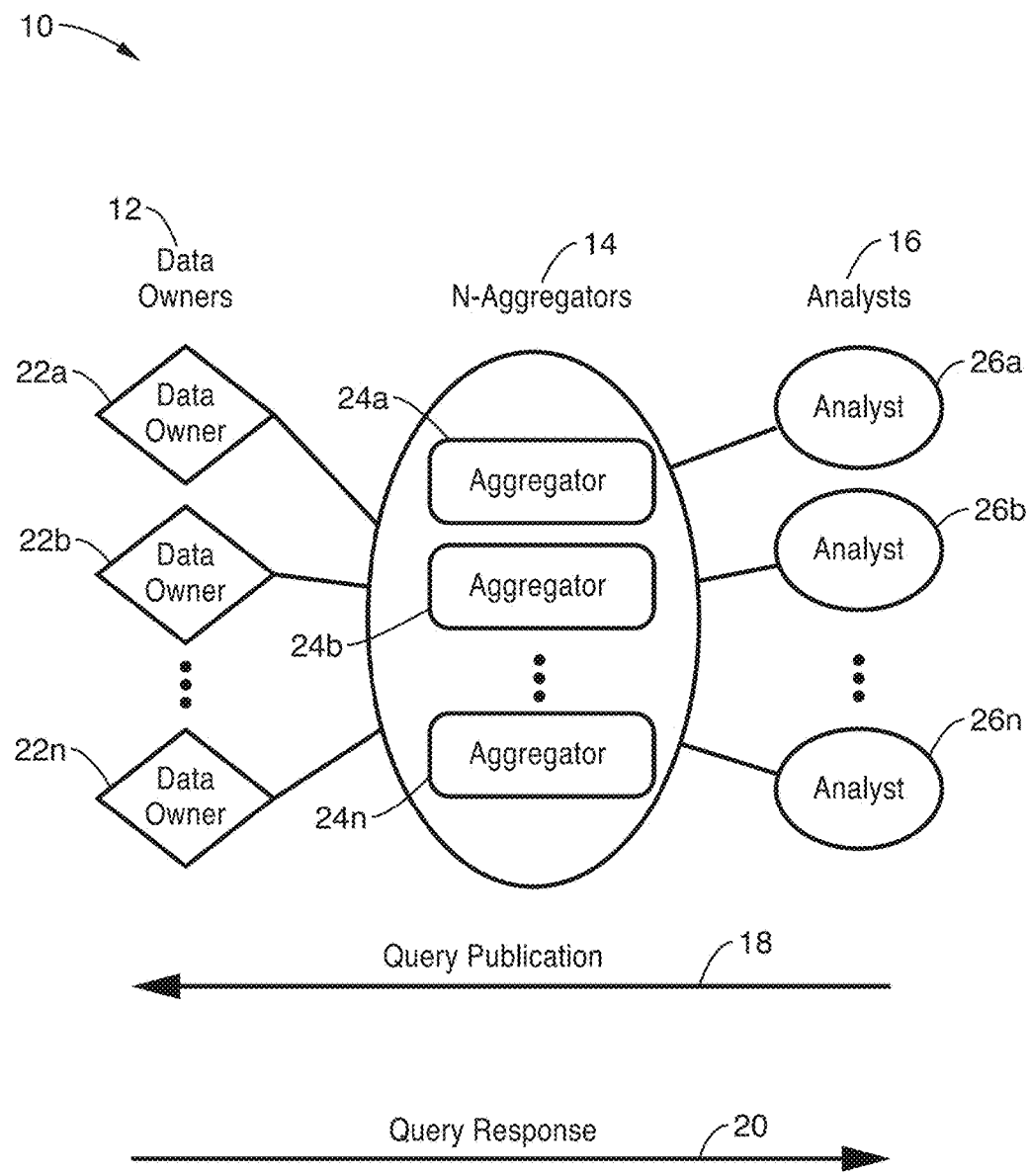
FIG. 1 is a block diagram of a networked configuration of data owners, data aggregators and data analysts utilized according to an embodiment of the present disclosure.

FIG. 1 illustrates an example embodiment 10 of the relationship between data owners 12 comprising a plurality of Data Owners 22a, 22b through 22n, Aggregators 14 comprising a plurality of separate Aggregators 24a, 24b through 24, and Analysts 16 with a plurality of Analysts 26a through 26n. In this example it will be noted that query publications 18 traverse from Analysts 16 through Aggregators 14 to the Data Owners 12. Conversely, query responses traverse from Data Owners 12 to Aggregators 16 and to Analysts 16.

Aggregation parties (servers) may try to collude, though the disclosed system must assume there is at least one honest aggregation party. Each individual aggregation party is owned by a distinct reputable analyst.

Aggregation servers are expected to be available and online, so we do not consider denial of service attacks whereby data owners are not able to transmit their responses. The basic design assumes aggregation servers are honest-but-curious, i.e., servers do not corrupt the messages though can attempt to read all messages.

The system handles data owners' privatized location responses so that they leak no more data than if they were not participating in the population study. Each data owner retains their own data on devices that they control and manage. The data owners then choose to participate in responding to each query. All responses before they leave the data owner are privatized and anonymized. The privacy mechanism should satisfy the local differential privacy criteria. Thus, there is no centralized or trusted aggregation mechanism that adds differentially private noise.

2. Privacy Mechanism

Local privacy is provided whereby data owners privatize their data before uploading to the cloud aggregation servers.

2.1. Technique 1

This technique is based on the metaphor of coin flipping probabilities. Each data owner flips the first coin. If it comes up heads, the data owner responds truthfully; otherwise, the data owner flips the second coin and reports the result of this second coin flip.

Suppose there are N data owners participating in the population study. Let $\hat{Y}$ represents the total aggregate of "yes" randomized answers. The estimated population with the sensitive attribute $Y_A$ can be computed by subtracting the noise as:

$$Y_A = \frac{\hat{Y} - (1-p) \times q \times N}{p} \qquad (1)$$

wherein values p and q control the bias as described below.

The intuition behind randomized response is that it provides "plausible deniability", in that any truthful answer can produce a response of either "yes" or "no", and data owners retain strong deniability for any response answers. If the first coin always comes up heads, there is high utility yet no privacy. Conversely, if the first coin is always tails, there is low utility though strong privacy. It has been shown, as reflected in Table 1, that by carefully controlling the bias of the two coin flips, one can strike a balance between utility and privacy.

Figure 2A:
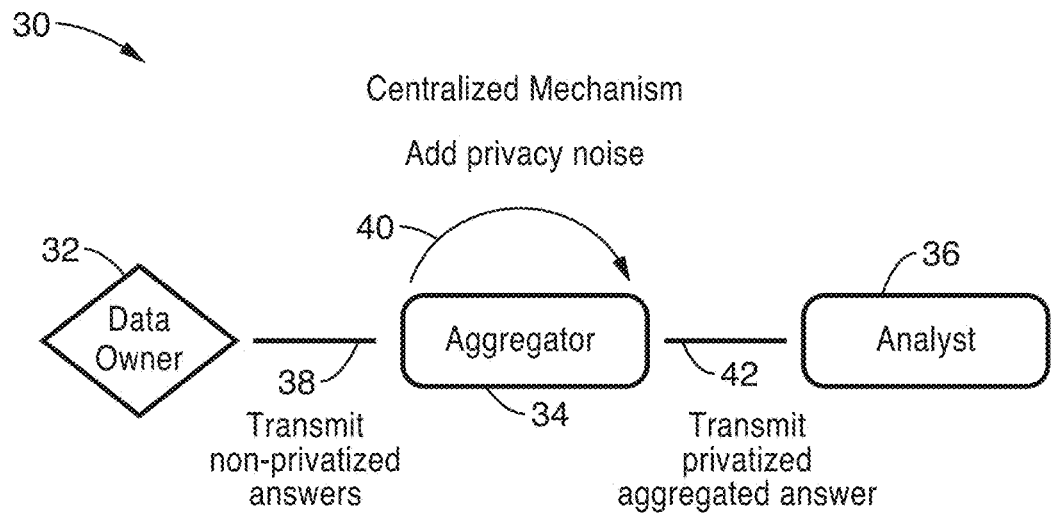
FIG. 2A and FIG. 2B are comparisons of a centralized and distributed mechanism for privatization and aggregation.
Figure 2B:
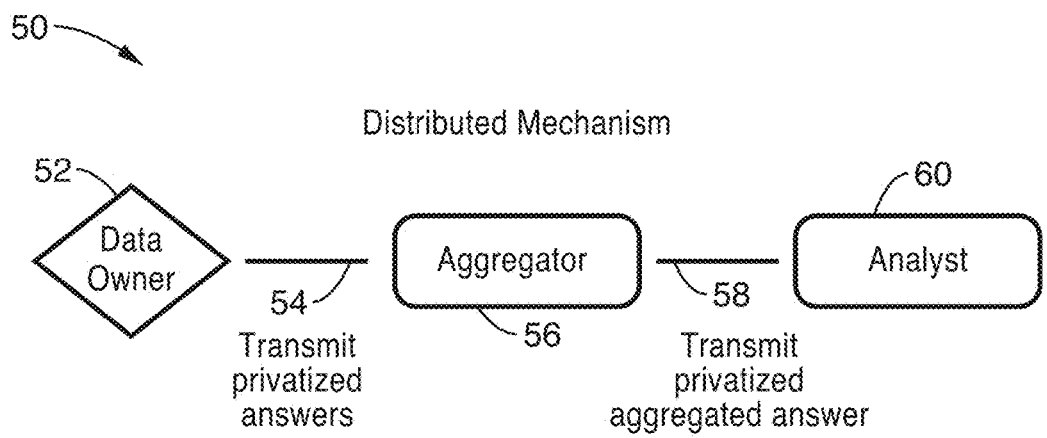

FIG. 2A and FIG. 2B illustrate example embodiments of a Centralized Mechanism 30 in FIG. 2A and a Distributed Mechanism 50 in FIG. 2B.

In the above Centralized Mechanism of FIG. 2A, a Data Owner 32 communicates 38 to an Aggregator 34. An analyst 36 is coupled to Aggregator 34 through communication 42. The Data Owner 32 transmits non-privatized (unprivatized) answers to Aggregator 34. Privacy noise 40 is added by trusted aggregator 34 which first collects the unprivatized real data. The aggregator then privatizes the aggregate answer before releasing this through communication 42 with Analyst 36. This scenario requires that the aggregator must be trusted and thus is susceptible to data breaches and attacks.

In the Distributed Mechanism 50 of FIG. 2B, a Data Owner 52 communicates 54 to an Aggregator 56. An analyst 60 is coupled to Aggregator 56 through communication 58. Data Owner 52 transmits privatized (non-public) answers to Aggregator 56. Aggregator 56 transmits privatized aggregated answers to Analyst 60. Each data owner in this scenario privatizes their data before uploading to the aggregator. This protects the data owner from the aggregator targeting and performing inference attacks as well as eliminating the use of a central database which susceptible to database breaches and coordinated attacks.

Figure 3:
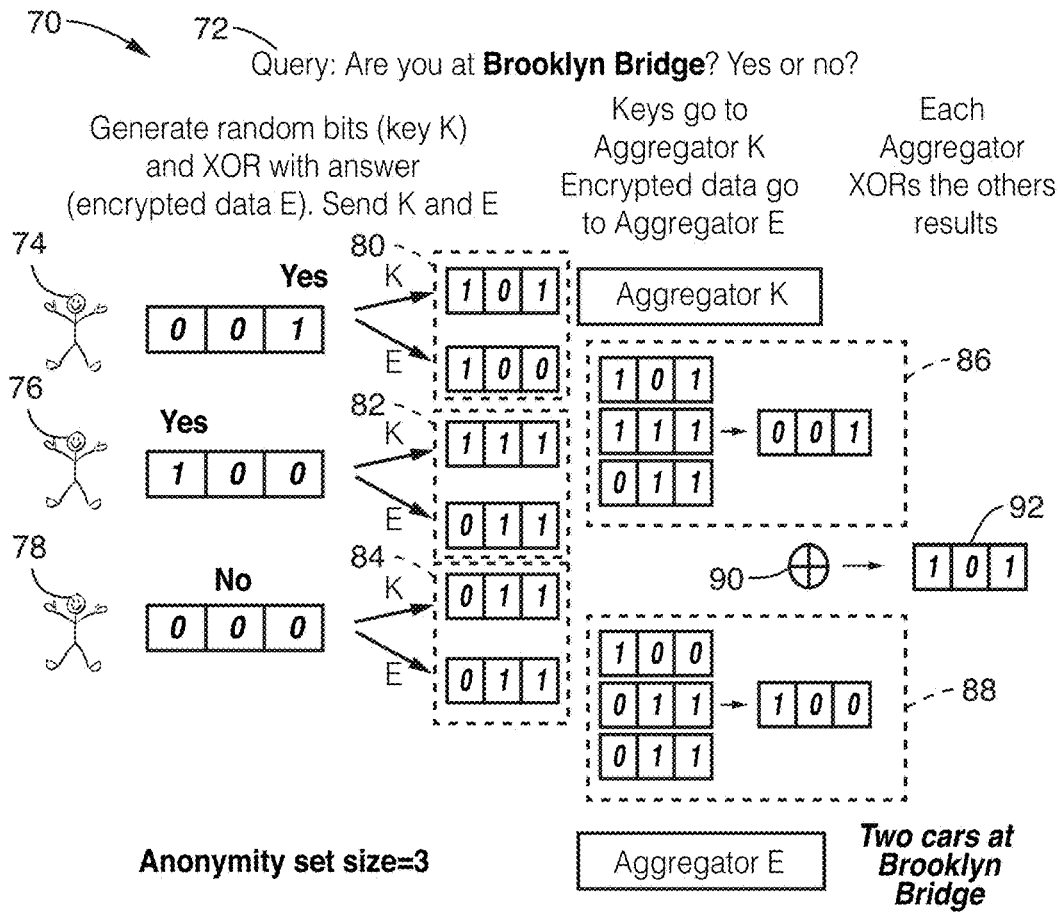
FIG. 3 is a block diagram of a first query response exemplifying use of an embodiment according to the present disclosure.

FIG. 3 through FIG. 6 describe a Haystack mechanism utilized in the present disclosure. The example embodiment 72 in FIG. 3 is an example location query whereby each data owner 74, 76, 78 replies 1 for Yes and 0 for No indicating whether they are, or are not, at the location. It should be appreciated that the present disclosure is not limited to queries involving 'location', but may be utilized with any desired query types. Considering the case that we would like to write into a database without the database learning which row we wrote into. For this case a distributed database is assumed, such that as long as one database operator remains honest and does not collude with other database operators, it is not possible to learn which database row was written into. It will be seen that dashed areas 80, 82, 84 show the randomly generated key (K) and encrypted value (E) being sent to each aggregator separately. The key is generated randomly by each data owner 74, 76, 78 and is then XORed with the value to keep confidential the generation of encrypted value (E).

For the two database setting, the simple protocol proceeds as follows. Assume the database has n rows. The data owner has a bitstring of size n. The data owner selects the row (index) of the bitstring to write to and sets the value to 1. Every other index is set to 0. Next, the data owner generates a random bitstring of size n. This bitstring serves as the "key". The data owner then XORs the "key" with the original bitstring to produce the "encrypted" bitstring. The data owner then transmits the "key" to one database operator 86 and the "encrypted" bitstring to the other database operator 88.

A second data owner then repeats the process of generating the bitstring and selecting a value, generating a key, and encrypting the bitstring. As the database operators receive each bitstring, the operator XORs the bitstrings together. Thus, one database operator XORs all the keys and the other database operator XORs all the encrypted bitstrings 90.

Finally, at the end of the agreed epoch, the database operators share the XORed bitstrings with each other. By doing so, they are able to reconstruct a database consisting of each data owners chosen row 92.

However, the database operators are unable to determine which data owner wrote to which row as long as there is at least two data owners and at least one database operator does not collude with any other. It should be noted that there is also an assumption that the data owners do not write to the same row, though this can be avoided by sizing the database large enough to avoid collisions.

To generalize this scenario to Z database operators, the protocol proceeds as follows. The data owner has a bitstring of size n. The data owner selects the row (index) of the bitstring to write to and sets the value to 1. Every other index is set to 0. Next, the data owner generates Z−1 random bitstrings of size n. These bitstrings serve as the "virtual" single key. The data owner then XORs the Z−1 "keys" with the original bitstring to produce the "encrypted" bitstring. The data owner transmits each separate key to a different database operator and the encrypted bitstring to the other database operator.

Figure 4:
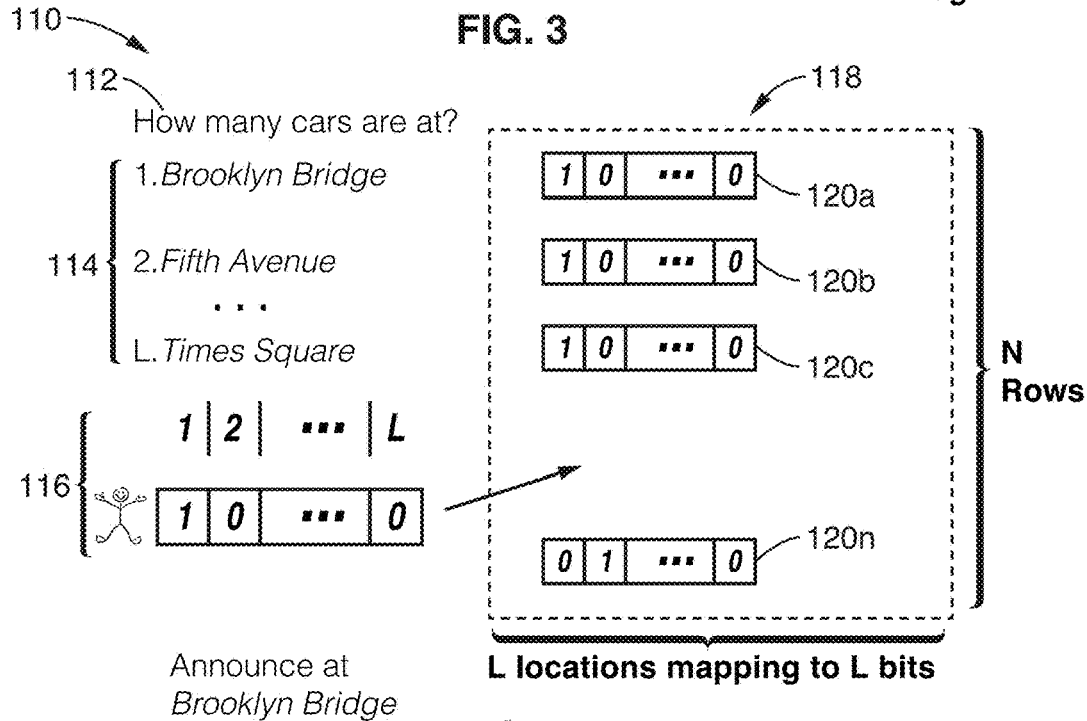
FIG. 4 is a block diagram of a second query response exemplifying use of an embodiment according to the present disclosure.

FIG. 4 shows an example embodiment 110 of a counting query of how many cars 112 at multiple locations 114. Block 116 is the data owner responding to multiple locations and 118 is the database of all the data owners where each row 120a, 120b, . . . , 120n represents a single data owner.

Figure 5:
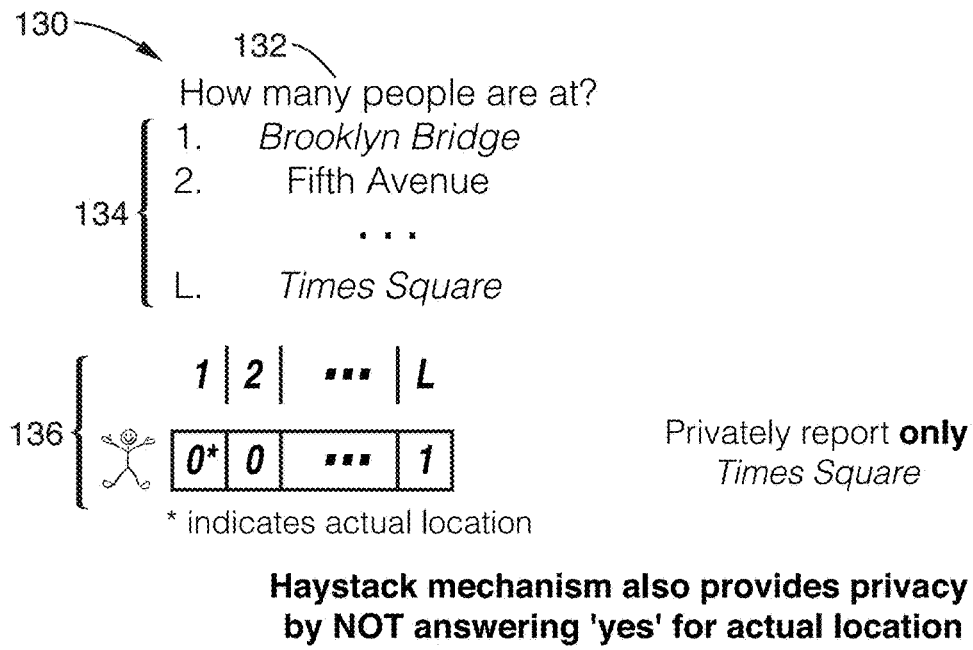
FIG. 5 is a block diagram of a third query response exemplifying use of an embodiment according to the present disclosure.

FIG. 5 shows an example embodiment 130 of the counting query 132 at multiple locations 134. Though this time the data owner doesn't answer truthfully and instead answers with another location they are not actually at 136.

Figure 6:
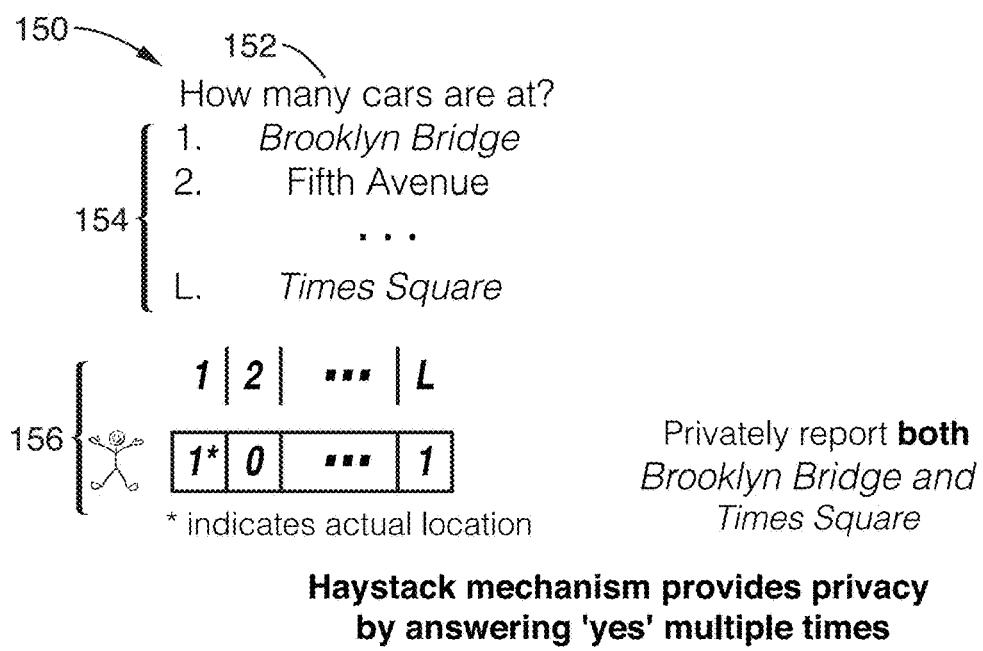
FIG. 6 is a block diagram of an alternative to the second query response exemplifying use of an embodiment according to the present disclosure.

FIG. 6 illustrates an example embodiment 150 with counting query 152 at multiple locations 154. This time the data owner replies they are simultaneously at multiple locations 156.

Figure 7:
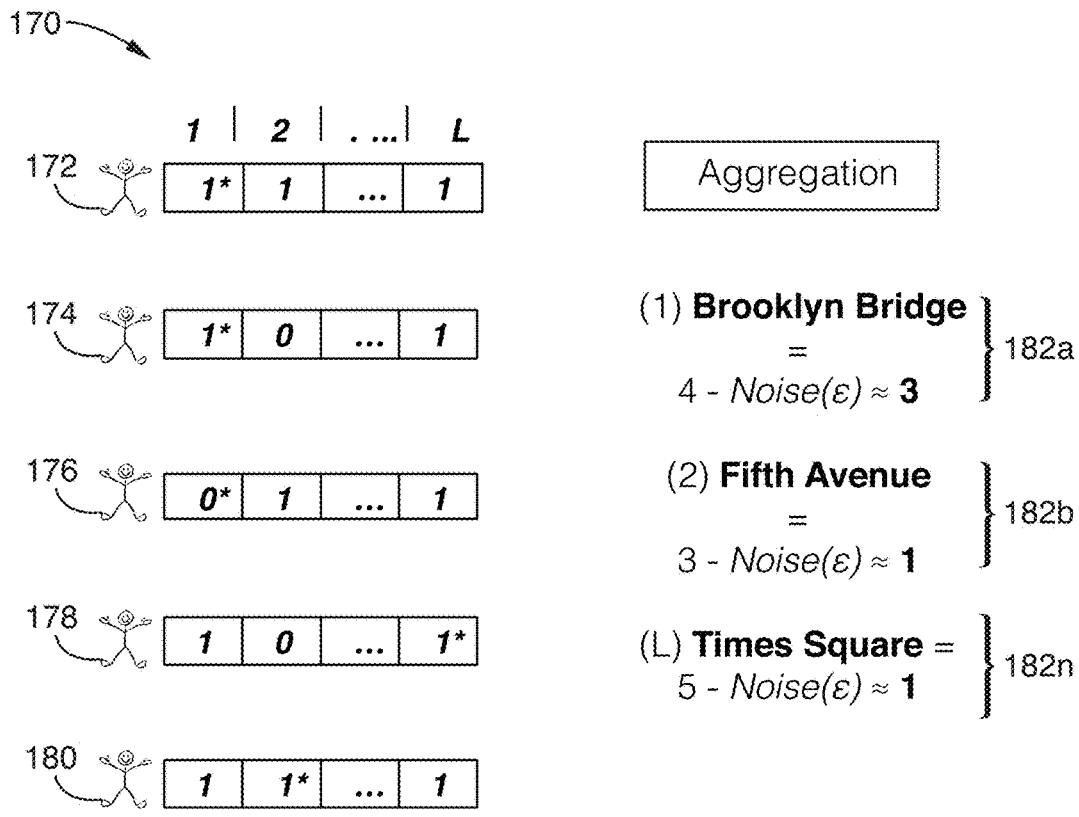
FIG. 7 is a block diagram of aggregation of queries exemplifying use of an embodiment according to the present disclosure.

FIG. 7 illustrates an example embodiment 170, showing the information from FIG. 5 and FIG. 6 in the aggregate view. Example scenarios are shown of the data owners 172, 174, 176, 178 and 180 whereby each data owner either answers simultaneously their actual location and other locations, only other locations, or sometimes their actual location. In sections 182a, 182b through 182n, the aggregators sum the value of each column (1) Brooklyn Bridge, (2) Fifth Avenue, (L) Times Square. The aggregators then subtract the estimated privacy noise to recover the estimated counts of the number of people at each location.

Thus, in utilizing the Haystack mechanism each data owner selects a row uniformly at random from an N×L matrix, where N is the number of rows, which must be greater than the number of data owners, and performs a cryptographic private write. It should be appreciated that this must be N rows where N is much greater than the number of data owners, so as to protect against collisions whereby two or more data owners select the same row. A crowd sourced regional query maps each location to a bit. The query specifies two Bernoulli trials to privately respond. Each privatized response is protected by reporting multiple locations and by sometimes NOT reporting the actual location. Aggregation is performed for each location. The final aggregate output is calculated by subtracting the expected value of the privacy noise due to the Bernoulli trials.

The following defines and describes Haystack Privacy according to the present disclosure. The construct utilized according to at least one embodiment is similar to the multiple party cryptographic (MPC) setting in the previous section. The main difference is that privacy noise is generated in a distributed fashion by all data owners participating, rather than relying on MPC to aggregate the "Yes" responses and then perform a threshold check.

The system model of at least one embodiment of the present disclosure is in the same setting as local privacy models resembling the randomized response mechanism. However, the model of the present disclosure differs in that the output space consists of three values, namely "Not Participating", "Yes", and "No" rather than the two values of "Yes" and "No". Additionally, the model of the present disclosure extends the population space to include all data owners so that a data owner blends with at least k other data owners and is simultaneously in multiple crowds (e.g., multiple locations).

The following define the construction of this in at least one embodiment of the present disclosure. First, the data owner performs independent and identically distributed (i.i.d.) random sampling with probability $\pi_s$ to determine if they will participate. If not, the data owner writes ⊥, which can be considered to be the NULL value.

Second, the data owner responds with an L bit vector, one bit for each location. Thus in essence, the data owner tosses the first coin with probability $\pi_1$ for each location. If heads, the data owner should answer truthfully. If tails, then the data owner tosses the second coin with probability $\pi_2$ and replies "Yes" if heads and "No" if tails. This means for their actual location, the data owner responds "Yes" with probability $\pi_s \times \pi_1$, and for the locations they are not at, they respond "Yes" with probability $\pi_s \times (1-\pi_1) \times \pi_2$.

Next, the privatized L bit vector is privately written to the aggregators utilizing the FSS cryptographic primitive. The aggregators verify the shares as described in the previous section utilizing an anonymous share verification, for example FSS share verification. At the end of the epoch (iteration), the aggregators finalize the contributed writes into the N×L matrix without knowing which rows each data owner wrote to.

Finally, the aggregators then sum each column of the N×L matrix. The disclosed method now estimates the aggregate count for each location as follows:

(Estimated Aggregated Count) Let Yes represent the total number of data owners that truthfully answer "Yes" (i.e., they are at the particular location). Let No represent the total number of data owners that truthfully answer "No" (i.e., they are not at the particular location). Let DO=Yes+No that is the total number of data owners that participate. Let $\hat{Y}$ represent the noisy aggregate of "Yes" privatized responses. The estimated population $Y_L$ (i.e., those actually at the particular location) can be calculated by subtracting the expected value of the noise as:

$$Y_L = \frac{\hat{Y} - ((1-\pi_1) \times \pi_2 \times \text{Yes}) - ((1-\pi_1) \times \pi_2 \times \text{No})}{\pi_1} \quad (2)$$

$$= \frac{\hat{Y} - ((1-\pi_1) \times \pi_2 \times \text{DO})}{\pi_1}$$

The term containing the No population approaches the expected value as this term increases. Although it would be desirable to increase the term containing the Yes population, that value is fixed). The disclosed method leverages the law of large numbers and expands the query to force the No population (e.g., those not at a particular location) towards its expected value, thus increasing accuracy.

Haystack Indistinguishability. The disclosed Haystack mechanism provides the ability for a single data owner to blend with at least k other data owners in a distributed manner. The blending crowd is drawn from a small fraction of the No population. As the No population is increased, the blending crowd size also increases. Additionally, a single data owner simultaneously blends in multiple crowds. In the example provided, the result is that a single data owner may appear in multiple locations.

2.2. Definition of Haystack Indistinguishability

Let D be any database, and let crowd C be defined as any group of at least k data owners. A privacy mechanism San, which is an abbreviation of a privacy-preserving sanitization mechanism, is $(\kappa,\varepsilon)$—haystack private if for every database D and every owner $i \in D$, either $\text{San}(D) \approx_\varepsilon \text{San}(D/i)$, i $\varepsilon$ blends with more than one crowd C, or both.

$\text{San}(D) \approx_\varepsilon \text{San}(D/i)$ means that essentially removing a specific data owner does not significantly change the result, allowing that data owner to blend in the crowd, such as when sampling occurs.

At least one embodiment of the disclosed Haystack mechanism satisfies Crowd Blending as each data owner blends with at least k other data owner due to the noise provided by the No population $(\pi_s \times (1-\pi_1) \times \pi_2 \times \text{No})$. It is known that performing pre-sampling before a Crowd Blending privacy mechanism results in a privacy mechanism which satisfies zero-knowledge privacy, and which is strictly stronger than differential privacy. This is due to the output distribution from random sampling of the entire population being essentially the same as the aggregated view. Thus, the disclosed Haystack satisfies zero knowledge privacy.

3. Anonymized Privacy Mechanism

A principle goal of the system is to be able to increase the population participating, such that the data owners blend with each other to provide privacy protection. As randomization is controlled, a mechanism is constructed in which the error introduced by the sampling variance cancels out. An example embodiment of this mechanism can be constructed as follows. Each data owner responds twice for the same query, though flips a single term (e.g., single coin toss) to allow for the error cancelation. YES refers to the population that is at a particular location and conversely NO are those that are not.

$$\text{YES}_A \text{ Privatized Value} = \begin{cases} \perp_1 & \text{with probability } \pi_{\perp_1} \\ \perp_1 & \text{with probability } \pi_Y \\ \perp_2 & \text{with probability } 1 - \pi_{\perp_1} - \pi_Y \end{cases} \quad (3)$$

$$\text{NO}_A \text{ Privatized Value} = \begin{cases} \perp_1 & \text{with probability } \pi_{\perp_1} \\ \perp_1 & \text{with probability } \pi_{\perp_N} \\ \perp_2 & \text{with probability } 1 - \pi_{\perp_1} - \pi_{\perp_N} \end{cases} \quad (4)$$

$$\text{YES}_B \text{ Privatized Value} = \begin{cases} \perp_1 & \text{with probability } \pi_{\perp_1} - \pi_Y \\ \perp_2 & \text{with probability } \pi_Y \\ \perp_2 & \text{with probability } 1 - \pi_{\perp_1} \end{cases} \quad (5)$$

$$\text{NO}_B \text{ Privatized Value} = \begin{cases} \perp_1 & \text{with probability } \pi_{\perp_1} - \pi_{\perp_N} \\ \perp_2 & \text{with probability } \pi_{\perp_N} \\ \perp_2 & \text{with probability } 1 - \pi_{\perp_1} \end{cases} \quad (6)$$

The expected values are as follows:

$$E[\perp_{1_A}] = (\pi_{\perp_1} + \pi_Y) \times \text{YES} + (\pi_{\perp_1} + \pi_N) \times \text{NO} \quad (7)$$

$$= \pi_{\perp_1} \times \text{YES} + \pi_Y \times \text{YES} + \pi_{\perp_1} \times \text{NO} + \pi_N \times \text{NO}$$

$$= \pi_{\perp_1} \times \text{TOTAL} + \pi_Y \times \text{YES}_A + \pi_N \times \text{NO}$$

$$= \pi_{\perp_1} \times \text{TOTAL} + \pi_Y \times \text{YES}_A + \pi_N \times \text{TOTAL} - \pi_N \times \text{YES}$$

In view of the above relations, we can now subtract either pairs of expected values and solve for YES. Either $E[\perp_{1_A}] - E[\perp_{1_B}]$ or $E[\perp_{2_A}] - E[\perp_{2_B}]$. In order to solve the system of equations, the count $\pi_N \times \text{TOTAL}$ is revealed. It should be appreciated that this value only includes responses from the NO population and not the YES population. This value is then eliminated from both systems of equations which is solved for YES.

4. CrowdZen Privacy

At least one embodiment of the present disclosure utilizes the randomness of the physical system to provide for privacy protection. This approach differs as compared to privacy hardness due to the estimation error due to variance when sampling or due to the privacy noise as added by the Laplace mechanism.

The published aggregate information is a percentage value which indicates the estimated number of people at a particular location with respect to the maximum capacity.

The number of people is calculated, for instance, by counting the number of WiFi beacons sent by each device when it scans for available WiFi networks. Each device has a unique MAC address which is used to tally the total counts. The MAC address is never stored and is hashed with a salted value. The maximum capacity is taken by the maximum count of unique devices.

It should also be noted that individuals may have zero or many devices at any given time over a period of time. Also, the percentage is rounded, with the rounding up or down being randomly chosen each time using a biased coin toss. In addition to rounding, a plus or minus percentage point can be added.

This mechanism satisfies differential privacy as the removal or addition of a single person is indistinguishable from the single person not participating. This is due to the rounding error as well as the dynamic max capacity value. The max capacity value or actual number of device counts is never released. The only value which is released is the percentage.

5. Cryptographic Private Write Mechanism

Figure 8:
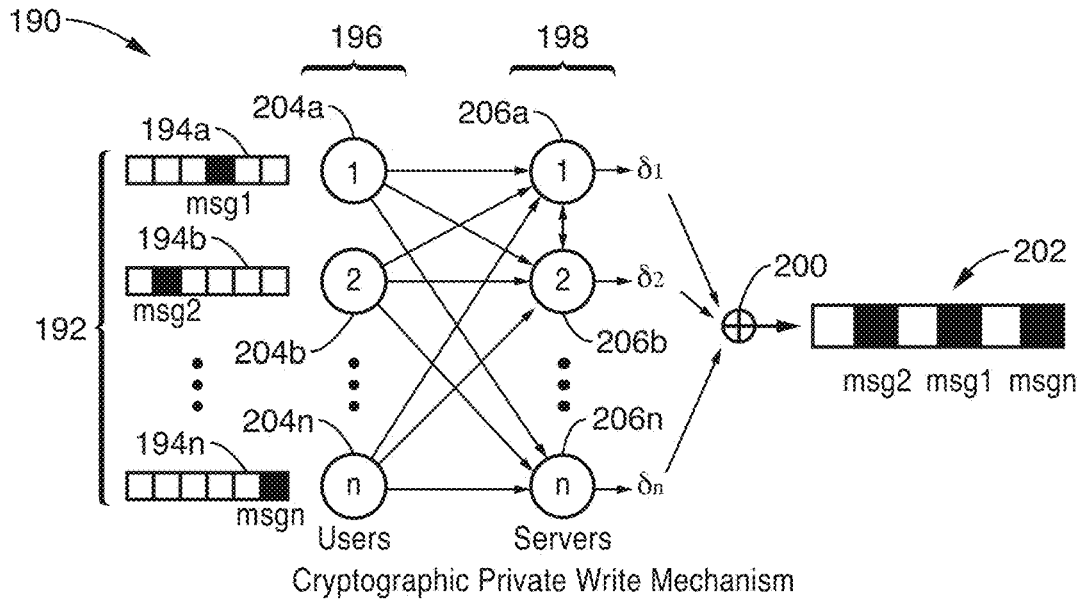
FIG. 8 is a block diagram of a cryptographic private write mechanism as utilized according to an embodiment of the present disclosure.

FIG. 8 illustrates an example embodiment 190 of Cryptographic private write mechanism. Similar to FIG. 3 each data owner 192 picks uniformly at random one database row to write their message 194a, 194b, . . . , 194n. Then nodes 204a, 204b, . . . , 204n represent each data owner 196 creating shares for aggregator 198 and then writing one share to each aggregator comprising aggregator 206a, 206b and 206n. The data owners generate the shares in 196 according to Algorithm 1 seen below. The aggregators then evaluate each share as Algorithm 2 and Algorithm 3 for 198. Algorithm 4 is an example method for summing 200. The resulting database of all data owners messages is shown 202 whereby the aggregators are not able to determine which data owner wrote to which row in the database.

5.1. Function Secret Sharing

Notation 5. Let $e_x \cdot y$ denotes a vector of length $2^{|x|}$ with y in location, with x and 0 in all other locations.

Notation 6. Let the number of parties $p \in \mathbb{N}$.

Notation 7. Let binary arrays of size $p \times 2^{p-1}$ contain an even and odd number of 1 bits respectively denoted by $E_p$ and $O_p$. Let the even binary array $E_p$ represent the set of all binary arrays such that each column contains a p-bit string of an even number of 1 bits. Let the odd binary array $O_p$ represent the set of all binary arrays such that each column contains a p-bit string of an odd number of 1 bits.

Notation 8. Let $A \in_R E_p$ denote that the binary array A is sampled randomly from the set of all even binary $E_p$, and let $A \in_R O_p$ denote that the binary array A is sampled randomly from the set of all odd binary $O_p$.

Privacy. The private write is maintained due to the following properties, assuming at least one honest party. An adversary will have at most p−1 shares which includes the blinded seeds. However, the distribution of these blinded p−1 seeds are all identically distributed after being masked by both the even and odd bit arrays due to the special row missing. The correction words are also blinded by the seeds, for which there is at least one seed that is missing in the p−1 subset. Thus, the p−1 subset of blinded seeds and correction words together are computationally indistinguishable from random.

Correctness. Given Gen(x,y)→(share$_1$, . . . , share$_p$) for all inputs $x' \in 2^n$ $$\sum_{i=0}^{p-1} Eval(k_i, x') = F_{x,y}(x') \qquad (8)$$

Let (γ, δ), respectively, be the lower and higher order bits of the database index x. Let (γ, δ) respectively be the lower and higher order bits of the database index x'. Three cases can result.

1. γ'≠γ. The blinding array is sampled from the even number of bits array, thus $cw_j \oplus G(s_{\gamma,j})$ appears an even number of times and cancels out, resulting in 0.

2. γ'=γ and δ'≠δ Due to the choice of the correction words, the evaluation of $\oplus_{i=1}^p y_i[\delta']=0$.

3. γ'=γ and δ'=δ The correction words and the seeds have the special row and thus will satisfy $\oplus_{i=1}^p y_i[\delta']=y$.

At the end of each epoch, the disclosed database contains all applied valid formed data owner requests such that each respective database index contains each data owner's written value.

By way of example and not limitation, the following algorithms are utilized in the process.

Algorithm 1: Gen(x,y): Share Generation (each data owner performs individually and independently)
Input: database index x, message y, message bit length m, number parties p.
Output: (share$_1$, . . . , share$_p$).
(i) Let $\mu \leftarrow \lceil 2^{1/2} \times 2^{(p-1)/2} \rceil$.
(ii) Let $v \leftarrow \lceil 2^n/\mu \rceil$.
(iii) Let PRG: $\{0,1\}^\lambda \rightarrow \{0,1\}^{m\mu}$.
(iv) Let γ represent the special row.
(v) Let (γ, δ), respectively be the lower and higher order bits of the database index x.
(vi) Choose by randomly sampling v arrays $(A_1, \ldots, A_v)$ where $A_\gamma \in_R O_p$ and $A_{\gamma'} \in_R E_p$ for all γ≠γ'.
(vii) Choose independently and randomly $v \times 2^{p-1}$ seeds $s_{1,1}, \ldots, s_{v,2^{p-1}} \in \{0,1\}^\lambda$.
(viii) Choose $2^{p-1}$ random correction word strings $cw_1, \ldots, cw_{2^{p-1}} \in \{0,1\}^{m\mu}$ such that $\oplus_{j=1}^{2^{p-1}} cw_j \oplus G(s_{\gamma,j})=e_\delta \cdot y$.
(ix) Assemble the seeds and set each $\sigma_{i,\gamma'} \leftarrow (s_{\gamma',1} \cdot A_{\gamma'[i,1]}) \| \ldots \| (s_{\gamma',2^{p-1}} \cdot A_{\gamma'}[i,2^{p-1}])$ for all 1≤i≤p, 1≤γ≤v.
(x) Concatenate the seed elements together and set each $\sigma_i = \sigma_{i,1} \| \ldots \| \sigma_{i,v}$ for 1≤i≤p.
(xi) Let each key $k_i = (\sigma^i \| cw_1 \| \ldots \| cw_{2^{-1}})$ for 1≤i≤p.
(xii) Return the shares (share$_1$, . . . , share$_p$).

Algorithm 2: Evaluate Share (each party independently evaluates each share received)
Input: share$_i$, message bit length m, input to evaluate x'.
Output: Evaluated share over a single input x'.
(i) Let $\mu \leftarrow \lceil 2^{n/2} \times 2^{(p-1)/2} \rceil$.
(ii) Let $v \leftarrow \lceil 2^n/\mu \rceil$.
(iii) Let PRG: $\{0,1\}^\lambda \rightarrow \{0,1\}^{m\mu}$ be a pseudorandom generator (e.g., AES in counter-mode).
(iv) Let γ represent the special row.
(v) Let (γ,δ), respectively, be the lower and higher order bits of the database index x'.
(vi) Parse $k_i$ as $k_i = (\sigma_{\gamma,i}, cw_1, \ldots, cw_{2^{p-1}})$.
(vii) Let $y_i \leftarrow \oplus_{j=1}^{2^{p-1}} cw_j \oplus G(s_{\gamma,j})$ excluding seeds for which $s_{\gamma',j}=0$.
(viii) Return $y_i[\delta]$.

Algorithm 3: Evaluate All Inputs for a Particular Share (each party independently performs).
Input: share$_i$, message bit length m
Output: Evaluated share
(i) Initialize $Z_i=0$.
(ii) For all inputs 0≤x'≤$2^n$ do . . .

(iia) Let $z_i \leftarrow$ Algorithm 3(share$_i$,m,x')
(iib) Let $Z_i = Z_i \oplus z_i$
(iii) Return $Z_i$.

Algorithm 4: Final Result (each party XORs and combines all the intermediate results).

Input: $Z_i, \ldots, Z_p$.
Output: final bit string result of all data owners.
(i) Initialize Z=0.
(ii) At the end of each epoch, each party broadcasts to all other parties it's computed $Z_i$.
(iii) Let $Z \leftarrow \oplus_{j=1}^{P} Z \oplus Z_i$
(iv) Return Z.

6. Protection Against Corrupt Uploads

6.1. Centralized Mechanism

Figure 9:
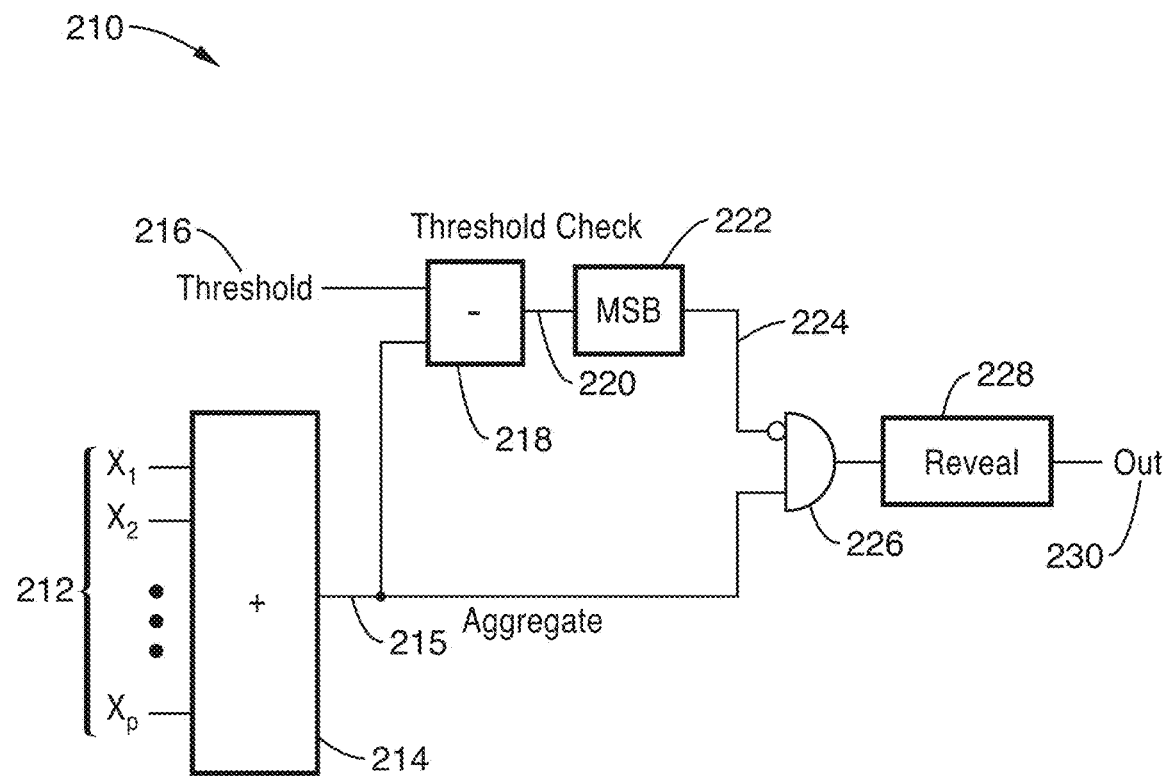
FIG. 9 is a block diagram of a centralized mechanism as utilized according to an embodiment of the present disclosure which protects against corrupt uploads.

FIG. 9 illustrates an example embodiment 210 of a BGW (Ben-Or, Goldwasser and Widgerson) protocol MPC circuit which satisfies zero-knowledge privacy.

The figure shows multiple party cryptographic (MPC) setting as the centralized mechanism. In at least one embodiment, each aggregator splits their values into shares using Shamir's Secret Sharing. The shares are distributed across all aggregators so that each aggregator has one share from every other aggregator 212. The share was submitted to each aggregator by the data owner. The aggregators sum these inputs to create an encrypted aggregate 214. The threshold check is calculated by subtracting the threshold from the encrypted aggregate 216. The threshold check is converted to bit representation in order for the aggregators to reveal the most significant bit (MSB) to detect if the aggregate is above or below the threshold 222. If the MSB is set to "0" (greater than the threshold), the servers release the aggregate. Otherwise, no values are released 228, 230.

In the figure, each data owner performs a pre-sampling step to decide whether they will contribute their shares to the aggregators. The aggregators then perform a BGW MPC to privately release the aggregate output to satisfy zero-knowledge privacy. The aggregators are also able to ensure that data owners only write to one database row.

Data owners contribute their responses 212 ($x_1$ to $x_i$) to the aggregators 214, assuming a pre-sampling step. The aggregators compute MPC which only reveals the aggregate output 215 if it is greater than a publicly known threshold value 216. Aggregate output 215 and threshold 216 are received by a threshold circuit 218 which outputs a result value 220, received by a binarization process 222, herein exemplified as extracting only the most-significant bit (MSB) of result 220 in generating binary output 224 to an inverted input of gate 226 along with the Aggregate signal 226, and outputs this binary control signal to reveal 228 controlling whether output 230 reveals the aggregate result. It will be appreciated that FIG. 9 is depicted and described in the form of a circuit diagram for simplicity of illustration, although it may be implemented in any desired combination of circuitry, logic, and/or executed programming (most typical).

Thus, in view of the above, privacy is maintained as long as there are less than $\lfloor (P-1)/2 \rfloor$ in which P is the number of aggregation parties which collude.

The following describes the operation of the above mechanism. First, every data owner responds to a L bit query where each location corresponds to a bit. The data owner sets the bit to '1' corresponding to their actual location.

Next, each data owner flips a biased coin specified by the sampling parameter $\pi_s$. If heads, the data owner keeps the bit set. If tails, the data owner simply writes $\perp$ to indicate they are not participating.

Then, each data owner performs a cryptographic private write utilizing a anonymizing cryptographic primitive, such as for example the recent Function Secret Sharing (FSS), or similar mechanisms and alternatives. FSS, and similar, enables each data owner to privately write a message to a particular database row without any aggregation party learning which row was written to. The FSS private write is protected as long as there are more than two data owners participating and as long as there is at least one aggregation party which does not collude.

Finally, the aggregators execute a BGW circuit to perform a threshold check on the aggregate output as seen in FIG. 9. The MPC circuit proceeds in the following steps: (a) Each aggregator splits their values into shares using Shamir's Secret Sharing. The shares are distributed across all aggregators so that each aggregator has one share from every other aggregator. (b) The aggregators sum these inputs to create an encrypted aggregate (215 in FIG. 9). (c) The threshold check 218 is determined by subtracting the threshold from the encrypted aggregate. (d) Threshold check 218 is converted to bit representation (at block 222 of FIG. 9) in order for the aggregators to reveal the most significant bit (MSB) (224 of FIG. 9) to detect if the aggregate is above or below the threshold. (e) If the MSB is set to "0" (greater than the threshold), the servers release the aggregate. Otherwise, no values are released.

The threshold comparison check (i.e., the greater than zero test for the aggregate minus the threshold parameter) requires the conversion of the shares to bit value. By way of example and not limitation, a bit conversion MPC algorithm can be utilized. This algorithm takes as input a share created by Shamir's Secret Sharing Algorithm $[a]_p$ and returns the bit representation of the share $[a]_b$. First, an array of encrypted random bits $[b]_b$ is generated. Next, the encrypted random bits are subtracted from the input $c=([a]_p-[b]_b)$ and c is released. Value c is converted to bit representation ($c_b$) in the clear. Each bit as needed can then be calculated $[a]_b=c_b+[b]_b$, despite only revealing the MSB. The complexity of the bit conversion algorithm is as follows. Let 1 represent the number of bits in the final conversion. The complexity is thus O(1 log(1)) invocations of BGW multiplication.

6.2. Distributed Mechanism

The following describes the MPC protocol run amongst the aggregator parties to verify all data owner shares. The protocol does not violate data owner privacy and is extremely efficient as it does not utilize any public-key primitives and relies solely on finite field operations. First the MPC protocol is described in detail followed by an example.

6.3. Share Verification

The following describes the MPC protocol run amongst the aggregator parties to verify all data owner shares. The protocol does not violate data owner privacy and is extremely efficient as it does not utilize any public-key primitives and relies solely on finite field operations.

First the MPC protocol is described in detail and then an example is provided.

MPC Protocol:

Let p represent the number of parties participating in the protocol.

Let n represent the unit vector length (e.g., length of the bit string or number of database slots).

Let m represent the number of bits of the message M.

Let $M \in F_Z$ where Z is a relatively large prime number.

Given $F_Z$ a finite field of characteristic Z, where Z is a relatively large prime, let R be a blinding (randomization) matrix where the values in the first row are chosen uniformly at random over $0, \ldots, Z-1$.

This is a particular randomization matrix such that elements of each row is raised to the power of the first row, where the power is equivalent to the row number. There will be a total of p rows, one for each party. That is, $$R = \begin{bmatrix} r_1 & r_2 & \ldots & r_n \\ r_1^2 & r_2^2 & \ldots & r_n^2 \\ \ldots & \ldots & \ldots & \ldots \\ r_1^p & r_2^p & \ldots & p_n^p \end{bmatrix} \quad (9)$$

The object is to secretly share a unit vector and verify that the shares correctly sum to the unit vector.

For example, $$\hat{u} = \begin{bmatrix} 0 \\ M \\ \ldots \\ 0 \end{bmatrix} \quad (10)$$

The value can be m bits taking on a value from the finite field of character of characteristic p, where p is a relatively large prime.

To share $\hat{u}$, the user can randomly generate a total p vectors $V_i$ $$V_i = \begin{bmatrix} v_{i,1} \\ v_{i,2} \\ \ldots \\ v_{i,n} \end{bmatrix} \quad (11)$$

such that $$\sum_{i=1}^{p} V_i = \hat{u} \quad (12)$$

the values are then made blind such that $$\sum_{i=1}^{p} R \cdot V_i = R \cdot \hat{u} \quad (13)$$

The following describe an example where n=2 and p=3. We know that sum of the vectors should equal the unit vector.

$$\begin{bmatrix} v_{1,1} \\ v_{1,2} \end{bmatrix} + \begin{bmatrix} v_{2,1} \\ v_{2,2} \end{bmatrix} + \begin{bmatrix} v_{3,1} \\ v_{3,2} \end{bmatrix} = \hat{u} \quad (14)$$

The randomization (blinding) matrix is now applied.

$$\begin{bmatrix} r_1 & r_2 \\ r_1^2 & r_2^2 \\ r_1^3 & r_2^3 \end{bmatrix} \cdot \begin{bmatrix} v_{1,1} \\ v_{1,2} \end{bmatrix} + \begin{bmatrix} r_1 & r_2 \\ r_1^2 & r_2^2 \\ r_1^3 & r_2^3 \end{bmatrix} \cdot \begin{bmatrix} v_{2,1} \\ v_{2,2} \end{bmatrix} + \begin{bmatrix} r_1 & r_2 \\ r_1^2 & r_2^2 \\ r_1^3 & r_2^3 \end{bmatrix} \cdot \begin{bmatrix} v_{3,1} \\ v_{3,2} \end{bmatrix} = R \cdot \hat{u} \quad (15)$$

$$\begin{bmatrix} r_1 \cdot v_{1,1} + r_2 \cdot v_{1,2} \\ r_1^2 \cdot v_{1,1} + r_2^2 \cdot v_{1,2} \\ r_1^3 \cdot v_{1,1} + r_2^3 \cdot v_{1,2} \end{bmatrix} + \begin{bmatrix} r_1 \cdot v_{2,1} + r_2 \cdot v_{2,2} \\ r_1^2 \cdot v_{2,1} + r_2^2 \cdot v_{2,2} \\ r_1^3 \cdot v_{2,1} + r_2^3 \cdot v_{2,2} \end{bmatrix} + \begin{bmatrix} r_1 \cdot v_{3,1} + r_2 \cdot v_{3,2} \\ r_1^2 \cdot v_{3,1} + r_2^2 \cdot v_{3,2} \\ r_1^3 \cdot v_{3,1} + r_2^3 \cdot v_{3,2} \end{bmatrix} = R \cdot \hat{u} \quad (16)$$

$$\begin{bmatrix} r_1(v_{1,1} + v_{2,1} + v_{3,1}) + r_2(v_{1,2} + v_{2,2} + v_{3,2}) \\ r_1^2(v_{1,1} + v_{2,1} + v_{3,1}) + r_2^2(v_{1,2} + v_{2,2} + v_{3,2}) \\ r_1^3(v_{1,1} + v_{2,1} + v_{3,1}) + r_2^3(v_{1,2} + v_{2,2} + v_{3,2}) \end{bmatrix} = R \cdot \hat{u} \quad (17)$$

Since the summation of the elements of a unit vector should sum to zero, the value can be denoted as follows $$\begin{bmatrix} a + b \\ a^2 + b^2 \\ a^3 + b^3 \end{bmatrix} = R \cdot \hat{u} \quad (18)$$

From Eq. 14 is it seen that the sum of the vectors is the unit vector. Thus, we then know that if the shares are properly formed that a and b should represent either all zeros or the blinded message. Thus, $(a+b)^2-(a^2+b^2)=0$ and $(a+b)^3-(a^3+b^3)=0$.

If a and b are both zero then the terms fall out. In the case of only a and b being the blinded message the terms fall out. If both a and b are non-zero then the difference will be a non-zero value. These shares are invalid and should be discarded.

6.4. Share Verification Analysis

In this section the protocol is analyzed to ensure that data owners' responses are correctly formed unit vectors where all indexes are zero except for only one index.

Correctness. The protocol outputs whether the final answer is a unit vector (i.e., all the indexes are zero except for one location). If the vector is all zeroes then the sum will be zero. If the answer is a unit vector then the blinded message terms fall out leaving zero. If the vector is not a unit vector, the sum will be non-zero and we can discard this share.

Privacy. All parties only view their own input and the final output. The blinding mechanism effectively masks the data owner's true value.

Fairness. All parties which participate will all view the same final answer as the shares sum to the same value.

7. Alternative Embodiments

It should be appreciated that alternative mechanisms can be utilized to achieve equivalency for achieving the private write. In this particular explanation the technique of the secret sharing function was utilized to achieve the cryptographic private write. Newer techniques or mechanisms can be alternatively selected which provide cryptographic anonymity guarantees as long as there is one honest aggregator which does not collude could be substituted.

If the cryptographic private write is eliminated, then the aggregation servers will be able to observe the privatized values (or truthful values) being stored. This then requires that the aggregation servers be trusted, which create a weak form of security and privacy and also opens the system to data breaches.

If data is stored in an unprivatized form and the aggregation servers are relied upon to privatize, then this requires that the aggregation servers be trusted which is a weak form of security and privacy and also opens to data breaches.

8. Alternate Uses

The present disclosure lends itself to numerous security applications in the field of data bases, cloud applications, internet servers, as well as in diverse fields. For example, the present disclosure may be utilized in self-driving vehicles and open data testbeds. It is imperative that for self-driving vehicles there is robust and accurate data that simultaneously protects the privacy of the drivers. The government and manufacturers need an open data testbed that the vehicles software and hardware can be benchmarked and evaluated upon.

9. Application Conditions

The disclosure describes using a binary value No or Yes (0 or 1). Therefore, many real world applications require that queries be converted from real values to a list of binary values. For the example of self-driving vehicles, vehicle speeds would be broken down into ranges, such as 0-9, 10-19, 20-29, . . . , 40-149, or similar upon which the queries are based. Theoretically any real-value query can be converted to a binary range. Though the assumption is that we are using binary value ranges.

10. Scalable Privacy Mechanism

A privacy mechanism that scales. That is, as the population increases the privacy strengthens due to the more number of data owners participating making it harder to distinguish who is actually providing the data. The error however remains constant. Other techniques which rely on coin tossing the error will become too large due to the variance. Consider the example where there are 100 vehicles. If we query over the Los Angeles Metro area, say a population of 1 million, any amount of sampling whereby those not of the 100 vehicles respond 1 for Yes will have such a large variance as to destroy any accuracy of the data. The Haystack as shown in 63-66 maintain the error rate. This is important for small populations especially the vehicle scenario where the number of cars on the highway or intersection is no more than a couple hundred.

Figure 10:
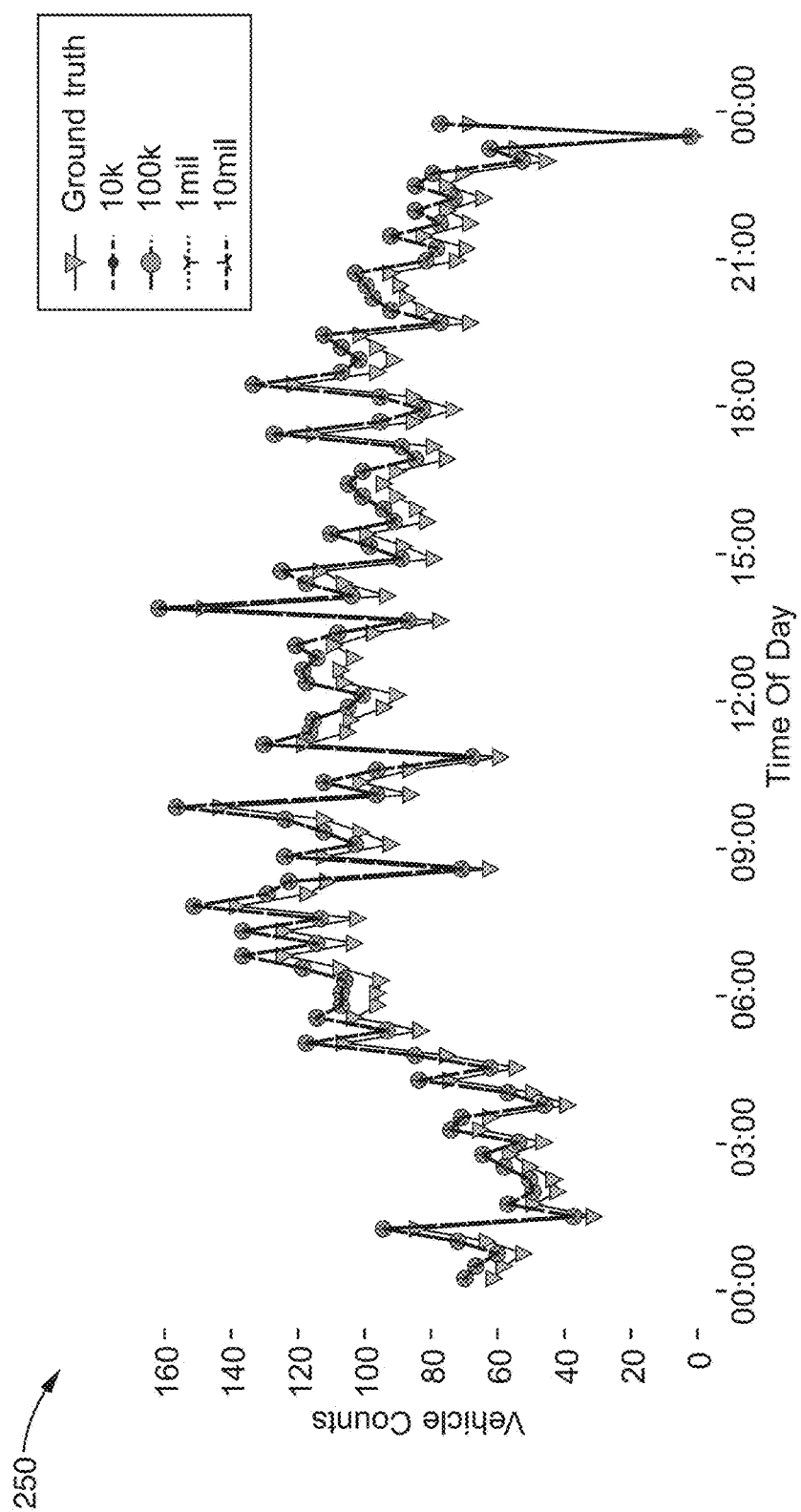
FIG. 10 is a plot of privacy for an increasing population as determined for an embodiment of the present disclosure.

FIG. 10 depicts an evaluation 250 in which the error remains the same despite increasing the population from 10 k to 10 mil participants. The figure shows ground truth versus privatized vehicle counts with a 95% confidence interval. The population not at the station being monitored (i.e., No population) increases by expanding the query to include additional vehicles not at the particular location.

Figure 11:
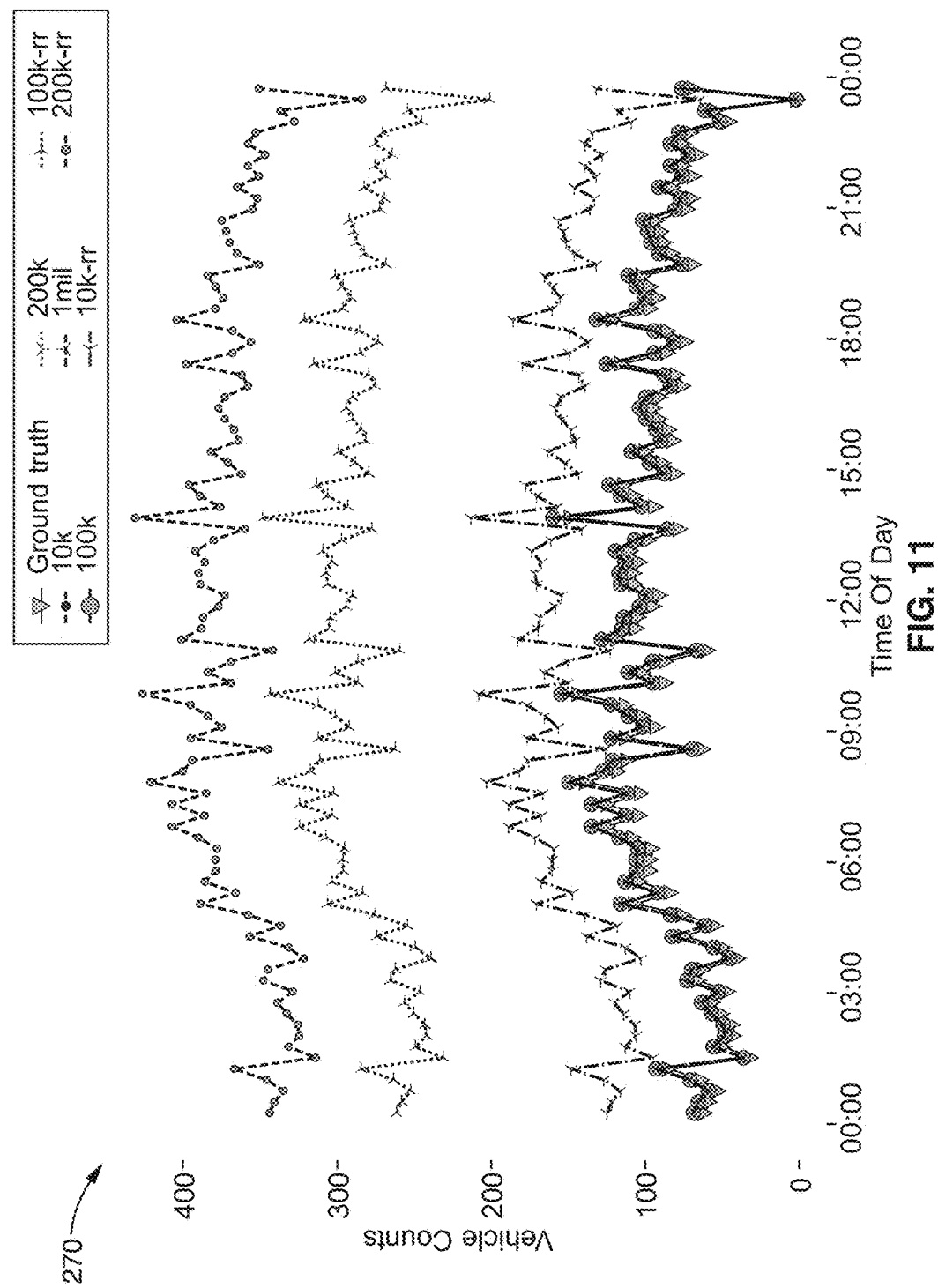
FIG. 11 is a plot of privacy for an increasing population utilizing other techniques in which error increases with population.

FIG. 11 shows 270 that with other techniques such as randomized response the error increases as the population increases, thus destroying the estimates (the three upper dotted lines). In particular, the figure shows ground truth versus privatized vehicle counts with a 99% confidence interval. The population not at the station being monitored (i.e., No population) increases by expanding the query to the given population.

10. Applicable Contexts

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to the following list of embodiments:

1. An apparatus for authorized privacy-preserving analysis of data from a mobile device, comprising: (a) a processor of a mobile device for a data owner having data; and (b) a non-transitory memory storing instructions executable by the processor; wherein said instructions, when executed by the processor, perform steps comprising: (b)(i) receiving a data query on the mobile device from an independent aggregator in response to a query generated by one or more data analyst; (b)(ii) responding indirectly to said data query and not with a truthful query response; (b)(iii) privatizing and anonymizing a truthful query response based on a privatized response mechanism which releases privatized data and not the truthful query response, thereby satisfying local differential privacy requirements through randomized response so that response for each data owner is independently and differentially private, regardless of the amount of differential privacy noise added by other data owners or system components; and (b)(iv) anonymously transmitting privatized responses from the data owner over an electronic network to a data aggregator, by generating anonymized secret shares that slice each privatized response into multiple shares and each share which has been anonymized results in performing an anonymized write, each share of which is individually transmitted to an independent aggregator, which is configured for independently and asynchronously processing each share, and sharing their results with one another to arrive at a privatized response over aggregate number of data owners for transmission to one or more data analyst.

2. The apparatus of any preceding embodiment, wherein said anonymized secret shares comprise functional secret shares.

3. The apparatus of any preceding embodiment, wherein said anonymized write is performed when a data owner writes a random row in a distributed database without any of database operators learning which row was written to, insofar as there is at least one honest database operator and at least two data owners participating.

4. The apparatus of any preceding embodiment, wherein said privatizing and anonymizing of a query response, is performed in epoch, at which time each data owner privately and anonymously transmits their respective answer to electronic data network servers of the independent aggregators using received responses within this epoch to arrive at the aggregate query response data.

5. The apparatus of any preceding embodiment, wherein said epochs are defined on order of seconds.

6. The apparatus of any preceding embodiment, wherein there is no need to synchronize instructions execution on computer processors of data owners for adding differential private noise.

7. The apparatus of any preceding embodiment, wherein anonymity of the data owner is maintained insofar as at least one of the multiple independent aggregators performs aggregation honestly.

8. The apparatus of any preceding embodiment, wherein privatizing is performed by the data owner having consent and control over data privatization, wherein each data owner is privatizing their data independently of each other, and that each data owner is anonymously uploading their data to the data aggregator in a scalable manner that is resilient to disruption and pollution attacks;

9. The apparatus of any preceding embodiment, wherein said privatizing and anonymizing is performed on the data of the data owner without relying on a trusted third party to perform the privatization.

10. The apparatus of any preceding embodiment, wherein said anonymously transmitting randomized response is performed without being linked to the data of the data owner.

11. The apparatus of any preceding embodiment, wherein said functional secret shares which are transmitted to the independent aggregators provide sufficient information to the collection of aggregators to allow performing inference and determining meaningful insights from the data.

12. The apparatus of any preceding embodiment, wherein said instructions executed on the computer processor performing privatizing of user data while preventing any single data owner from disrupting data query input from other data users through the independent aggregators.

13. The apparatus of any preceding embodiment, wherein said instructions executed on the computer processor performing privatizing of user data while preventing any single data owner from polluting aggregate answers collected across multiple independent aggregators.

14. The apparatus of any preceding embodiment, wherein said privatizing and anonymizing is performed on the data in real-time in a linearly scalable manner.

15. The apparatus of any preceding embodiment, wherein said apparatus performs privatizing and anonymizing without relying on trusted third party relationships to perform privatization.

16. The apparatus of any preceding embodiment, wherein said apparatus performs privatizing and anonymizing without sacrificing security for speed by using weak anonymous data uploads.

17. The apparatus of any preceding embodiment, wherein said apparatus performs privatizing and anonymizing without requiring cooperation of all data owners, whereby query response data collection is scalable.

18. The apparatus of any preceding embodiment, wherein said apparatus performs privatizing and anonymizing so that scalable privacy is maintained in which error remains constant while the privacy increases as the population increases.

19. The apparatus of any preceding embodiment, wherein said electronic network and said data aggregators are on the internet cloud to which personal data is directed from said mobile device, with the internet cloud having servers performing application functionality for data owners interacting with them on the internet.

20. An apparatus for authorized privacy-preserving analysis of data from a mobile device, comprising: (a) a processor of a mobile device for a data owner having data; and (b) a non-transitory memory storing instructions executable by the processor; wherein said instructions, when executed by the processor, perform steps comprising: (b)(i) receiving a data query on the mobile device from an independent aggregator in response to a query generated by one or more data analyst; (b)(ii) responding indirectly to said data query and not with a truthful query response; (b)(iii) privatizing and anonymizing a truthful query response based on a privatized response mechanism which releases privatized data and not the truthful query answer, thereby satisfying local differential privacy requirements through randomized response so that response for each data owner is independently and differentially private, regardless of amount of differential privacy noise added by other data owners or system components; and (b)(iv) anonymously transmitting privatized responses from the data owner over an electronic network to a data aggregator, by generating anonymized secret shares that slice each privatized response into multiple shares and each share which has been anonymized results in performing an anonymized write, each share of which is individually transmitted to an independent aggregator, which is configured for independently and asynchronously processing each share, and sharing their results with one another to arrive at a privatized response over aggregate number of data owners for transmission to one or more data analyst; (b)(v) wherein scalable privacy is maintained during said privatizing and anonymizing in which error remains constant while the privacy increases as the population increases.

21. The apparatus of any preceding embodiment, wherein said anonymized write is performed when a data owner writes a random row in a distributed database without any of database operators learning which row was written to, insofar as there is at least one honest database operator and at least two data owners participating.

22. The apparatus of any preceding embodiment, wherein said privatizing and anonymizing of a query response, is performed in epoch, at which time each data owner privately and anonymously transmits their respective answer to electronic data network servers of the independent aggregators using received responses within this epoch to arrive at the aggregate query response data.

23. The apparatus of any preceding embodiment: (a) wherein there is no need to synchronize instructions execution on computer processors of data owners for adding differential private noise; and (b) wherein anonymity of the data owner is maintained insofar as at least one of the multiple independent aggregators performs aggregation honestly.

24. A method of authorized privacy-preserving analysis of data from a mobile device, comprising: (a) receiving a data query by a data owner on a mobile device from an independent aggregator in response to a query generated by one or more data analyst; (b) responding indirectly to said data query by said mobile device so that it does not respond directly with a truthful query response; (c) privatizing and anonymizing a truthful query response based on a privatized response mechanism which releases privatized data and not a truthful query response, thereby satisfying local differential privacy requirements through randomized response so that response for each data owner is independently and differentially private, regardless of amount of differential privacy noise added by other data owners or system components; and (d) anonymously transmitting randomized privatized responses from the data owner over an electronic network to a data aggregator, by generating anonymized secret shares that slice each privatized response into multiple shares and each share which has been anonymized results in performing an anonymized write, each share of which is individually transmitted to an independent aggregator, which is configured for independently and asynchronously processing each share, and sharing their results with one another to arrive at a privatized response over aggregate number of data owners for transmission to one or more data analyst.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Bias Values, Error and Privacy Levels

| p | q | Relative Error ($\eta$) | Privacy Level ($\varepsilon$) |
|---|---|---|---|
| 0.3 | 0.3 | 0.1958 | 0.8873 |
|  | 0.6 | 0.1833 | 0.5390 |
|  | 0.9 | 0.1333 | 0.3895 |
| 0.6 | 0.3 | 0.0958 | 1.7918 |
|  | 0.6 | 0.0875 | 1.2528 |
|  | 0.9 | 0.0708 | 0.9808 |
| 0.9 | 0.3 | 0.0569 | 3.4340 |
|  | 0.6 | 0.0542 | 2.7726 |
|  | 0.9 | 0.0514 | 2.3979 |

What is claimed is:

1. An apparatus for authorized privacy-preserving analysis of data from a mobile device, comprising:
    (a) a processor of a mobile device for a data owner having data;
    (b) a non-transitory memory storing instructions executable by the processor; and
    (c) wherein said instructions, when executed by the processor, perform steps comprising:
        (i) receiving a data query on the mobile device from an independent aggregator in response to a query generated by one or more data analyst;
        (ii) responding indirectly to said data query and not with a truthful query response;
        (iii) privatizing and anonymizing a truthful query response based on a privatized response mechanism which releases privatized data and not the truthful query response, thereby satisfying local differential privacy requirements through randomized response so that response for each data owner is independently and differentially private, regardless of the amount of differential privacy noise added by other data owners or system components; and (iv) anonymously transmitting privatized responses from the data owner over an electronic network to a data aggregator, by generating anonymized secret shares that slice each privatized response into multiple shares and each share which has been anonymized results in performing an anonymized write, each share of which is individually transmitted to an independent aggregator, which is configured for independently and asynchronously processing each share, and sharing their results with one another to arrive at a privatized response over aggregate number of data owners for transmission to one or more data analyst.

2. The apparatus of claim 1, wherein said anonymized secret shares comprise functional secret shares.

3. The apparatus of claim 1, wherein said anonymized write is performed when a data owner writes a random row in a distributed database without any of database operators learning which row was written to, insofar as there is at least one honest database operator and at least two data owners participating.

4. The apparatus of claim 1, wherein said privatizing and anonymizing of a query response, is performed in epoch, at which time each data owner privately and anonymously transmits their respective answer to electronic data network servers of the independent aggregators using received responses within this epoch to arrive at the aggregate query response data.

5. The apparatus of claim 1, wherein said epochs are defined on order of seconds.

6. The apparatus of claim 1, wherein there is no need to synchronize instructions execution on computer processors of data owners for adding differential private noise.

7. The apparatus of claim 1, wherein anonymity of the data owner is maintained insofar as at least one of the multiple independent aggregators performs aggregation honestly.

8. The apparatus of claim 1, wherein privatizing is performed by the data owner having consent and control over data privatization, wherein each data owner is privatizing their data independently of each other, and that each data owner is anonymously uploading their data to the data aggregator in a scalable manner that is resilient to disruption and pollution attacks.

9. The apparatus of claim 1, wherein said privatizing and anonymizing is performed on the data of the data owner without relying on a trusted third party to perform the privatization.

10. The apparatus of claim 1, wherein said anonymously transmitting randomized response is performed without being linked to the data of the data owner.

11. The apparatus of claim 1, wherein said functional secret shares which are transmitted to the independent aggregators provide sufficient information to the collection of aggregators to allow performing inference and determining meaningful insights from the data.

12. The apparatus of claim 1, wherein said instructions executed on the computer processor performing privatizing of user data while preventing any single data owner from disrupting data query input from other data users through the independent aggregators.

13. The apparatus of claim 1, wherein said instructions executed on the computer processor performing privatizing of user data while preventing any single data owner from polluting aggregate answers collected across multiple independent aggregators.

14. The apparatus of claim 1, wherein said privatizing and anonymizing is performed on the data in real-time in a linearly scalable manner.

15. The apparatus of claim 1, wherein said apparatus performs privatizing and anonymizing without relying on trusted third party relationships to perform privatization.

16. The apparatus of claim 1, wherein said apparatus performs privatizing and anonymizing without sacrificing security for speed by using weak anonymous data uploads.

17. The apparatus of claim 1, wherein said apparatus performs privatizing and anonymizing without requiring cooperation of all data owners, whereby query response data collection is scalable.

18. The apparatus of claim 1, wherein said apparatus performs privatizing and anonymizing so that scalable privacy is maintained in which error remains constant while the privacy increases as the population increases.

19. The apparatus of claim 1, wherein said electronic network and said data aggregators are on the internet cloud to which personal data is directed from said mobile device, with the internet cloud having servers performing application functionality for data owners interacting with them on the internet.

20. An apparatus for authorized privacy-preserving analysis of data from a mobile device, comprising:

(a) a processor a processor of a mobile device for a data owner having data;

(b) a non-transitory memory storing instructions executable by the processor of a mobile device for a data owner having data; and (c) wherein said instructions, when executed by the processor, perform steps comprising:

(i) receiving a data query on the mobile device from an independent aggregator in response to a query generated by one or more data analyst;

(ii) responding indirectly to said data query and not with a truthful query response;

(iii) privatizing and anonymizing a truthful query response based on a privatized response mechanism which releases privatized data and not the truthful query answer, thereby satisfying local differential privacy requirements through randomized response so that response for each data owner is independently and differentially private, regardless of amount of differential privacy noise added by other data owners or system components; and (iv) anonymously transmitting privatized responses from the data owner over an electronic network to a data aggregator, by generating anonymized secret shares that slice each privatized response into multiple shares and each share which has been anonymized results in performing an anonymized write, each share of which is individually transmitted to an independent aggregator, which is configured for independently and asynchronously processing each share, and sharing their results with one another to arrive at a privatized response over aggregate number of data owners for transmission to one or more data analyst;

(v) wherein scalable privacy is maintained during said privatizing and anonymizing in which error remains constant while the privacy increases as the population increases.

21. The apparatus of claim 20, wherein said anonymized write is performed when a data owner writes a random row in a distributed database without any of database operators learning which row was written to, insofar as there is at least one honest database operator and at least two data owners participating.

22. The apparatus of claim 20, wherein said privatizing and anonymizing of a query response, is performed in epoch, at which time each data owner privately and anonymously transmits their respective answer to electronic data network servers of the independent aggregators using received responses within this epoch to arrive at the aggregate query response data.

23. The apparatus of claim 20:
   wherein there is no need to synchronize instructions execution on computer processors of data owners for adding differential private noise; and
   wherein anonymity of the data owner is maintained insofar as at least one of the multiple independent aggregators performs aggregation honestly.

24. A method of authorized privacy-preserving analysis of data from a mobile device, comprising:
   (a) receiving a data query by a data owner on a mobile device from an independent aggregator in response to a query generated by one or more data analyst;
   (b) responding indirectly to said data query by said mobile device so that it does not respond directly with a truthful query response;
   (c) privatizing and anonymizing a truthful query response based on a privatized response mechanism which releases privatized data and not a truthful query response, thereby satisfying local differential privacy requirements through randomized response so that response for each data owner is independently and differentially private, regardless of amount of differential privacy noise added by other data owners or system components; and
   (d) anonymously transmitting randomized privatized responses from the data owner over an electronic network to a data aggregator, by generating anonymized secret shares that slice each privatized response into multiple shares and each share which has been anonymized results in performing an anonymized write, each share of which is individually transmitted to an independent aggregator, which is configured for independently and asynchronously processing each share, and sharing their results with one another to arrive at a privatized response over aggregate number of data owners for transmission to one or more data analyst.

\* \* \* \* \*